(12) United States Patent
Khandelwal et al.

(10) Patent No.: US 10,141,554 B2
(45) Date of Patent: Nov. 27, 2018

(54) ENCLOSURES AND METHODS FOR REMOVING HYDROGEN GAS FROM ENCLOSURES

(71) Applicant: Emerson Network Power, Energy Systems, North America, Inc., Warrenville, IL (US)

(72) Inventors: Adarsh Khandelwal, Pune (IN); Jin Harrison Elkins, Auburn, AL (US)

(73) Assignee: Vertiv Energy Systems, Inc., Lombard, IL (US)

( * ) Notice: Subject to any disclaimer, the term of this patent is extended or adjusted under 35 U.S.C. 154(b) by 147 days.

(21) Appl. No.: 15/016,002

(22) Filed: Feb. 4, 2016

(65) Prior Publication Data

US 2016/0233471 A1 Aug. 11, 2016

(30) Foreign Application Priority Data

Feb. 10, 2015 (IN) .............................. 432MUM2015

(51) Int. Cl.
*H01M 2/00* (2006.01)
*H01M 2/12* (2006.01)
*H01M 2/10* (2006.01)

(52) U.S. Cl.
CPC ....... *H01M 2/1264* (2013.01); *H01M 2/1072* (2013.01); *H01M 2/1252* (2013.01)

(58) Field of Classification Search
CPC . H01M 2/1072; H01M 2/1252; H01M 2/1264
See application file for complete search history.

(56) References Cited

U.S. PATENT DOCUMENTS

| 5,691,076 | A | * | 11/1997 | Poe ..................... H01M 2/1252 |
| | | | | 429/175 |
| 6,102,103 | A | * | 8/2000 | Zobel ................. B60H 1/00492 |
| | | | | 165/10 |
| 6,119,768 | A | | 9/2000 | Dreier et al. |
| 6,294,721 | B1 | | 9/2001 | Oravetz et al. |
| 6,877,551 | B2 | | 4/2005 | Stoller |
| 6,889,752 | B2 | | 5/2005 | Stoller |
| 7,489,509 | B2 | | 2/2009 | Keenan et al. |

(Continued)

FOREIGN PATENT DOCUMENTS

WO WO-2012125116 A1 9/2012

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An equipment enclosure includes an inner chamber having a top, a bottom opposing the top, and a plurality of sides between the top and the bottom, an outer chamber adjacent one of said plurality of sides of the inner chamber, and a wall extending between the inner chamber and the outer chamber. The inner chamber is configured to house one or more rechargeable batteries capable of releasing hydrogen gas over time. The wall includes one or more perforations to allow hydrogen gas released by the one or more rechargeable batteries to pass from the inner chamber into the outer chamber. The outer chamber includes an exterior wall having one or more perforations to allow the hydrogen gas in the outer chamber to exit the enclosure. Other example enclosures and methods of exhausting hydrogen gas from enclosures are also disclosed.

20 Claims, 5 Drawing Sheets

(56) References Cited

U.S. PATENT DOCUMENTS

| | | |
|---|---|---|
| 8,115,145 B2 | 2/2012 | Shariff et al. |
| 2003/0228516 A1* | 12/2003 | McDermott ........ H01M 2/0207 |
| | | 429/160 |
| 2010/0171400 A1 | 7/2010 | Hill |
| 2013/0040174 A1* | 2/2013 | Takasaki ............. H01M 2/1077 |
| | | 429/82 |
| 2013/0095356 A1* | 4/2013 | Shimizu .............. H01M 2/1077 |
| | | 429/88 |
| 2016/0197324 A1* | 7/2016 | DeKeuster ........... H01M 2/305 |
| | | 429/82 |

* cited by examiner

ENCLOSURES AND METHODS FOR REMOVING HYDROGEN GAS FROM ENCLOSURES

CROSS-REFERENCE TO RELATED APPLICATION

This application claims the benefit and priority of Indian Patent Application No. 432/MUM/2015 filed Feb. 10, 2015. The entire disclosure of the above application is incorporated herein by reference.

FIELD

The present disclosure relates to enclosures and methods for removing hydrogen gas from enclosures.

BACKGROUND

This section provides background information related to the present disclosure which is not necessarily prior art.

Enclosures may house components that release undesirable gases. For example, some batteries release hydrogen gas when recharging. This hydrogen gas may cause explosions when, for example, the concentration of hydrogen gas in an enclosure rises above about four percent. Typically, enclosures include one or more active systems (e.g., fans, etc.), perforations, etc. to exhaust the hydrogen gas.

SUMMARY

This section provides a general summary of the disclosure, and is not a comprehensive disclosure of its full scope or all of its features.

According to one aspect of the present disclosure, an equipment enclosure includes an inner chamber having a top, a bottom opposing the top, and a plurality of sides between the top and the bottom, an outer chamber adjacent one of said plurality of sides of the inner chamber, and a wall extending between the inner chamber and the outer chamber. The inner chamber is configured to house one or more rechargeable batteries capable of releasing hydrogen gas over time. The wall includes one or more perforations to allow hydrogen gas released by the one or more rechargeable batteries to pass from the inner chamber into the outer chamber. The outer chamber includes an exterior wall having one or more perforations to allow the hydrogen gas in the outer chamber to exit the enclosure. Other example enclosures and methods of exhausting hydrogen gas from enclosures are also disclosed.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
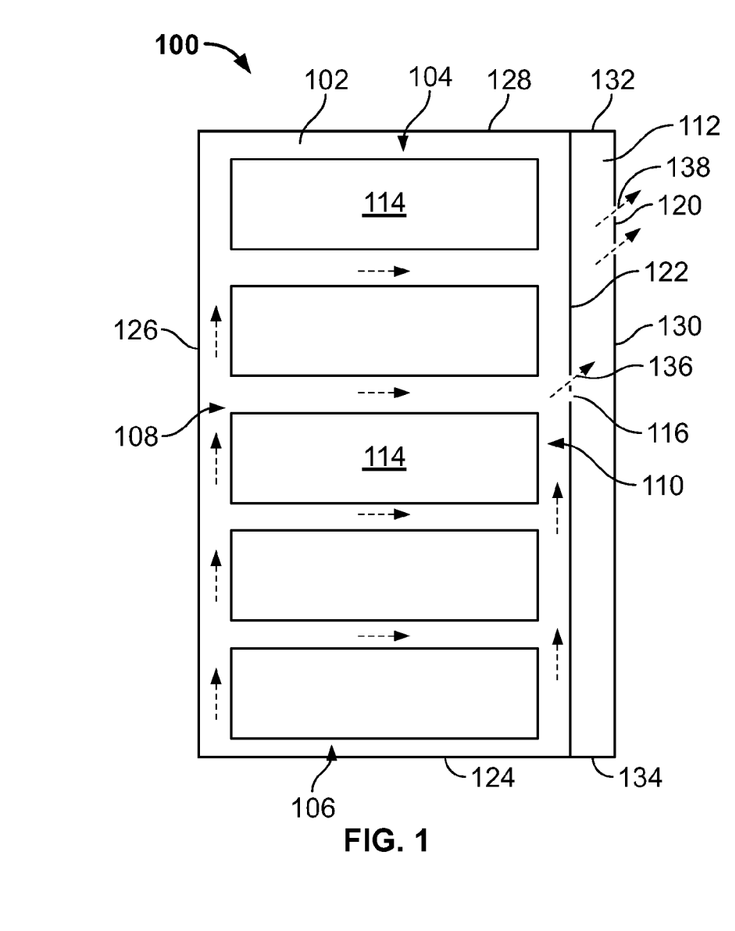
FIG. 1 is a block diagram of an equipment enclosure including an inner chamber, an outer chamber, and a wall extending between the chambers and including one set of perforations according to one example embodiment of the present disclosure.

An equipment enclosure according to one example embodiment of the present disclosure is illustrated in FIG. 1, and indicated generally by reference number 100. As shown in FIG. 1, the equipment enclosure 100 includes an inner chamber 102 including a top portion 104, a bottom portion 106 opposing the top portion 104, and side portions 108, 110 between the top portion 104 and the bottom portion 106, an outer chamber 112 adjacent the side portion 110 of the inner chamber 102, and a wall 122 extending between the inner chamber 102 and the outer chamber 112 inner chamber 102. The inner chamber 102 houses one or more rechargeable batteries 114 capable of releasing hydrogen gas over time. The wall 122 includes one or more perforations 116 to allow hydrogen gas released by the rechargeable batteries 114 to pass from the inner chamber 102 into the outer chamber 112. The outer chamber 112 includes an exterior wall 130 having one or more perforations 120 to allow the hydrogen gas in the outer chamber 112 to exit the equipment enclosure 100.

By employing an outer chamber adjacent an inner chamber (sometimes referred to as a dual wall system) and perforations in walls of the chambers, hydrogen gas released from rechargeable batteries may be able to naturally exhaust from an enclosure. For example, the enclosure may outgas hydrogen without one or more active cooling systems (e.g., a fan, etc.) and/or some passive cooling systems (e.g., a large number of vents, etc.) which may cause turbulence, increased temperatures, increased contaminants (e.g., water, dust, insects, etc.) within the enclosure, etc. As such, the enclosure may efficiently exhaust hydrogen gas to maintain a suitable concentration of hydrogen gas without impacting thermal performance of the enclosure.

The perforations 116, 120 are positioned in the walls 122, 130, respectively, to allow the hydrogen gas to exhaust from the enclosure naturally. For example, and as shown in FIG. 1, the perforations 120 of the outer chamber wall 130 are positioned above the perforations 116 of the side wall 122. This configuration allows the hydrogen gas which is less dense and therefore lighter than the surrounding air in the enclosure 100 to rise towards the top portion 104 of the enclosure 100 passing through the lower positioned perforations 116 (relative to the perforations 120). As this hydrogen gas continues to rise in the outer chamber 112, it can pass through the higher positioned perforations 120 (relative to the perforations 116) and exit the enclosure 100.

As shown in FIG. 1, the inner chamber 102 may be defined by multiple walls. For example, the inner chamber 102 is defined at least by side walls (of which walls 122, 126 are shown), a bottom wall 124 (e.g., a floor, etc.) and a top wall 128 (e.g., a ceiling) opposing the bottom wall 124. As explained above, the side wall 122 includes the perforations 116 to allow hydrogen gas released by the rechargeable batteries 114 to pass from the inner chamber 102 into the outer chamber 112 as indicated by the arrow 136 of FIG. 1. Additionally and/or alternatively, the top wall 128, the side wall 126 and/or another side wall (not shown) of the inner chamber 102 may include perforations as explained above.

Similarly, the outer chamber 112 may be defined by multiple external walls and one or more internal walls. For example, in the example of FIG. 1, the outer chamber 112 is defined by a bottom external wall 134 (e.g., a floor, etc.), a top external wall 132 (e.g., a ceiling) opposing the bottom wall 134, a side external wall 130 extending between the top external wall 132 and the bottom wall 134, and the side wall 122. Thus, in the example embodiments of FIG. 1, the outer chamber 112 and the inner chamber 102 share the wall 122 extending therebetween as explained above and may share a top wall.

Alternatively, the inner chamber 102 and the outer chamber 112 may include separate side walls coupled together to form a wall extending between the inner chamber 102 and the outer chamber 112. In such examples, each separate side wall may include aligned perforations to allow hydrogen gas released by the rechargeable batteries 114 to pass from the inner chamber 102 into the outer chamber 112 as explained above.

The top external wall 132 and/or the bottom external wall 134 of the outer chamber 112 may be a portion of the top wall 128 and/or the bottom wall 124 of the inner chamber 102 (e.g., one top wall and/or bottom wall extending across the enclosure 100), coupled to the top wall 128 and/or the bottom wall 124, etc. As such, the inner chamber 102 and the outer chamber 112 may share at least a portion of multiple walls of the enclosure 100.

As shown in FIG. 1, the side external wall 130 includes the perforations 120 to allow the hydrogen gas in the outer chamber 112 to exit the equipment enclosure 100 as indicated by the arrows 138. Although FIG. 1 illustrates the external wall 130 as including the perforations 120, it should be apparent to those skilled in the art that one or more other walls (e.g., the external walls 132, 134, etc.) of the outer chamber 112 may include one or more perforations in addition and/or alternative to the perforations 120.

Additionally, although FIG. 1 illustrates the side wall 122 and the external side wall 130 as including two perforations, it should be apparent more or less perforations may be employed without departing from the scope of the disclosure.

The rechargeable batteries 114 of FIG. 1 are shown as battery stacks including multiple batteries. For example, and as shown in FIG. 1, the enclosure 100 includes five rechargeable battery stacks each including multiple batteries. The rechargeable batteries 114 may be used to provide backup power to a load when a primary power source (e.g., rectifiers, etc.) is unable to provide adequate power. Although the enclosure 100 is shown to include five rechargeable battery stacks 114, it should be apparent more or less rechargeable battery stacks may be employed without departing from the scope of the disclosure.

Further, and as shown in FIG. 1, the equipment enclosure 100 include the rechargeable battery stacks 114 but no other electronic equipment. Thus, the equipment enclosure 100 of FIG. 1 may be considered a battery enclosure. Additionally and/or alternatively, the equipment enclosure 100 may include one or more other components including, for example, telecommunications equipment, power components (e.g., rectifiers, converters, etc.), etc.

Figure 2:
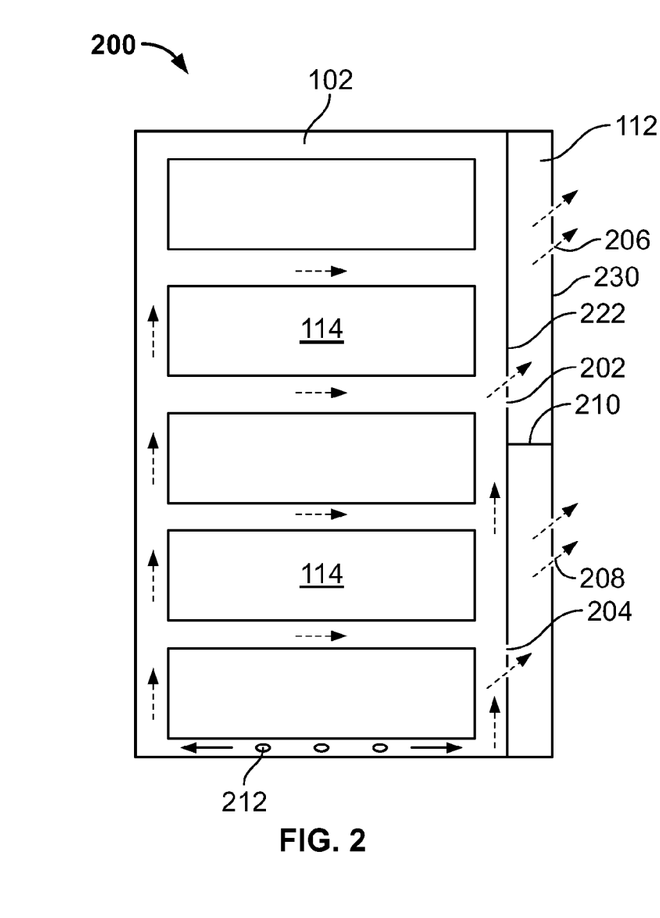
FIG. 2 is a block diagram of an equipment enclosure including an inner chamber, an outer chamber, a wall extending between the chambers, and a plate traversing the outer chamber according to another example embodiment.

FIG. 2 is another example equipment enclosure 200 substantially similar to the equipment enclosure 100 of FIG. 1. The equipment enclosure 200 of FIG. 2, however, includes multiple sets of perforations to allow hydrogen gas released by the rechargeable batteries 114 to pass from the inner chamber 102 into the outer chamber 112 and then to exit the equipment enclosure 200.

For example, the inner chamber 102 is defined at least partially by a wall 222 and the outer chamber 112 is defined at least partially by the wall 222 and an external wall 230. The walls 222, 230 may be substantially similar to the walls 122, 130 as explained above with reference to FIG. 1. The wall 222 and the wall 230, however, each include two sets of perforations 202, 204 and 206, 208, respectively.

The sets of perforations may be positioned in the walls 222, 230 to allow hydrogen gas to exhaust from the enclosure naturally as explained above. For example, the perforations 202, 204 may be positions below the perforations 206, 208, respectively. As such, hydrogen gas released from the rechargeable batteries 114 may rise and pass through the lower positioned perforations 202, 204 (relative to the perforations 206, 208, respectively) and the higher positioned perforations 206, 208 (relative to the perforations 202, 204, respectively) to exit the enclosure 200 as explained above.

As shown in FIG. 2, the enclosure 200 further includes a plate 210 extending between the external wall 230 of the outer chamber 112 and the side wall 222 between the inner chamber 102 and the outer chamber 112. For example, and as shown in FIG. 2, the plate 210 is positioned between the perforations 202, 206 and the perforations 204, 208. In the example of FIG. 2, the plate 210 includes a solid plate. As such, after the hydrogen gas passes through the perforations 204, it is unable to pass through the solid plate 210 and reenter the inner chamber 102 via the perforations 202. Instead, the hydrogen gas is exhausted from the enclosure 200 via perforations 208 as explained above.

Additionally, the enclosure 200 includes multiple perforations 212 positioned in an external wall of the enclosure to allow ambient air to enter the inner chamber 102. For example, and as shown in FIG. 2, the perforations 212 are positioned near a bottom portion of the enclosure 200. As such, ambient air enters near the bottom of the enclosure and then may exhaust from the enclosure 200 with the hydrogen gas via the perforations 202, 204, 206, 208. This air flow may assist in regulating the temperature within the enclosure 200, exhausting hydrogen gas from the enclosure 200, etc.

Although FIG. 2 illustrates three perforations 212 to allow ambient air to enter the enclosure 200, it should be apparent more or less perforations 212 may be employed depending on, for example, thermal management concerns, hydrogen gas management concerns, etc.

Figure 3:
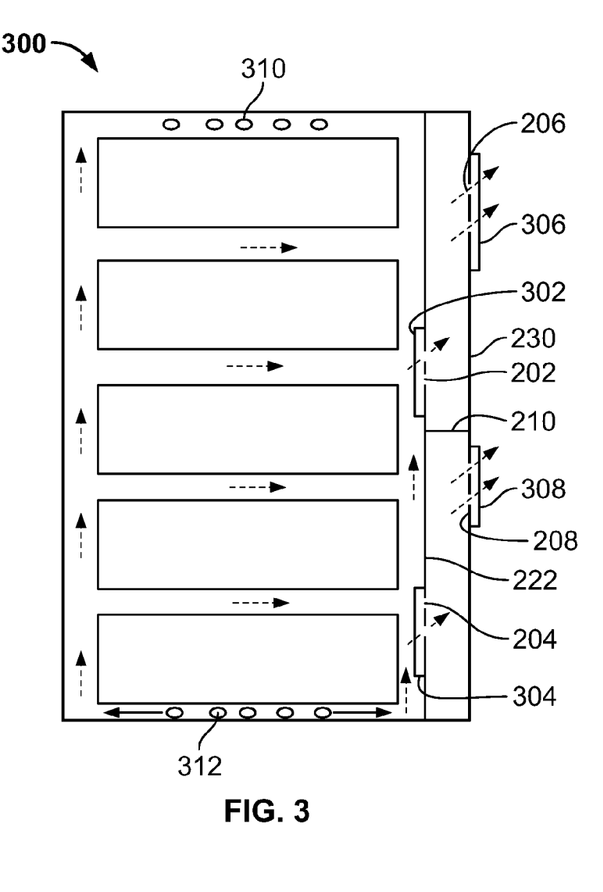
FIG. 3 is a block diagram of an equipment enclosure including an inner chamber, an outer chamber, and a wall extending between the chambers and including multiple sets of perforations according to yet another example embodiment.

FIG. 3 an example equipment enclosure 300 substantially similar to the equipment enclosure 200 of FIG. 2. The equipment enclosure 300 of FIG. 3, however, includes filters 302, 304, 306, 308 adjacent the perforations 202, 204, 206, 208, respectively, of the exterior wall 230 and the wall 222. The filters 302, 304, 306, 308 allow hydrogen gas to pass and restrict water from entering the chambers. For example, the filters 302, 304 restrict water from entering the inner chamber 102 and the filters 306, 308 restrict water from entering the outer chamber 112.

As shown in FIG. 3, one filter (e.g., the filter 302) substantially covers one group of perforations (e.g., the perforations 202). Alternatively, more than one filter may be employed for each group of perforations, one or more groups of perforations may not be covered by a filter, the filter may cover a portion of the perforations, etc.

Additionally, the enclosure 300 includes five perforations 312 positioned in an external wall near a bottom portion of the enclosure and five perforations 310 positioned in the external wall near a top portion of the enclosure. The perforations 310, 312 assist in creating air flow through the enclosure 300 as explained above with respect to FIG. 2. For example, ambient air may enter the perforations 312 and then exhaust from the perforations 310 and/or the perforations 202, 204, 206, 208 as explained above. In some embodiments, the filters 302, 304, 306, 308 may restrict air from exhausting (but allow hydrogen gas to pass) via the perforations 202, 204, 206, 208. In such cases, the enclosure 300 would exhaust air via the perforations 310.

Although FIG. 3 illustrates the perforations 310, 312 positioned in the same external wall, it should be apparent some or all perforations 310 and/or some or all perforations 312 may be positioned in different external walls of the enclosure 300. Additionally, although five perforations 312 and five perforations 310 are shown in FIG. 3, it should be apparent more or less perforations may be employed if desired. For example, the perforations 310 may include three perforations and the perforations 312 may include six perforations.

Figure 4:
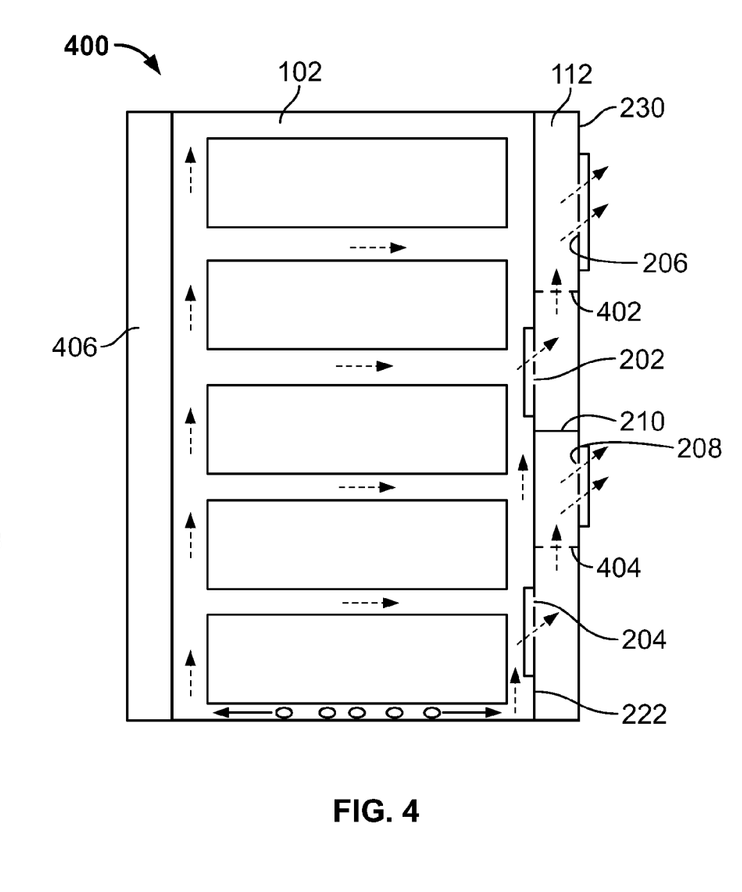
FIG. 4 is a block diagram of an equipment enclosure including an inner chamber, an outer chamber, a wall extending between the chambers, and perforated plates traversing the outer chamber according to another example embodiment.

FIG. 4 is another example equipment enclosure 400 substantially similar to the equipment enclosure 300 of FIG. 3. The equipment enclosure 400 of FIG. 4, however, includes plates 402, 404 extending between the external wall 230 of the outer chamber 112 and the wall 222 between the inner chamber 102 and the outer chamber 112. In particular, the plate 402 is positioned between the perforations 202, 206 and the plate 404 is positioned between the perforations 204, 208.

As shown in FIG. 4, the plates 402, 404 include perforated plates. As such, water and other contaminants may be substantially restricted from entering the inner chamber 102. For example, water may pass through the perforations 206, 208 and into the outer chamber 112 if the filters are malfunctioning, applied incorrectly, and/or absent. In such cases, the water falls to the plates 402, 404 and then passes through the perforations in the plates 402, 404 in a relatively controlled manner.

For example, water and/or other contaminants may pass through perforations in the plates and fall (e.g., slowly drip, etc.) in a substantially vertical path to a bottom portion of the outer chamber 112 and/or to the solid plate 210. As such, the water and/or other contaminants may not enter the inner chamber 102 via the perforations 202, 204. In such cases, the bottom portion of the outer chamber 112 and/or an area adjacent the solid plate 210 may include a drainage system to remove the water and/or other contaminants from the enclosure 400.

In other example embodiments, one or more filters may be positioned adjacent (e.g., covering, etc.) the perforations in one or both plates 402, 404. The filters may function similar to the filters 302, 304, 306, 308 explained above.

Although FIG. 4 illustrates the enclosure 400 as including two perforated plates 402, 404, it should apparent more or less plates may be employed. For example, more or less perforated plates may be employed based on the number perforations (e.g., groups of perforations), the placement of the perforations, etc. In some embodiments, the perforated plate 404 may be removed leaving only the perforated plate 402.

Additionally, and as shown in FIG. 4, the enclosure 400 includes a thermal management system 406 adjacent a side wall of the inner chamber 102 opposite the outer chamber 112. Alternatively, the thermal management system 406 may be adjacent another suitable wall and/or area of the enclosure. The thermal management system 406 may include, for example, a shroud, one or more heat generating components (e.g., heaters, etc.), one or more heat dissipating components (e.g., heat exchangers, thermoelectric assemblies, fans, heat sinks, etc.), etc. In some examples, the thermal management system 406 may be a part of a door for the enclosure 400, etc.

Figure 5:
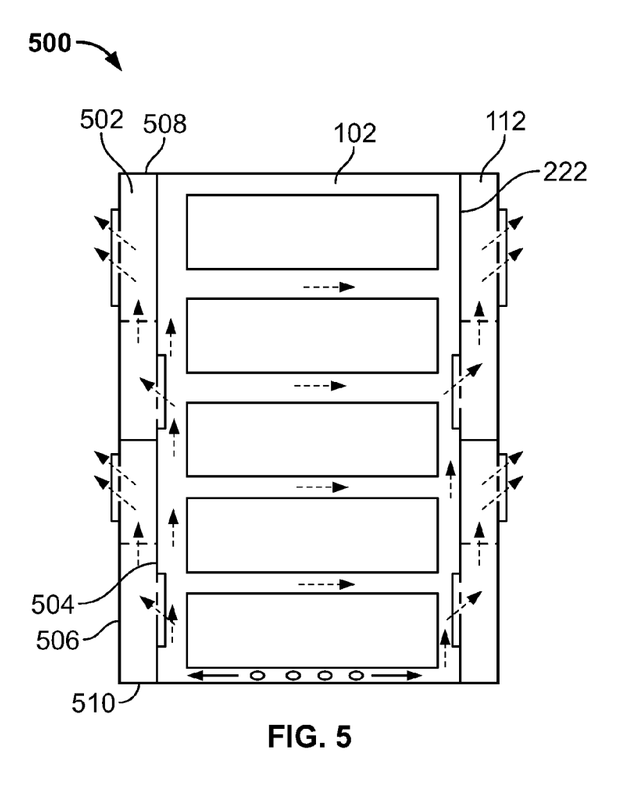
FIG. 5 is a block diagram of an equipment enclosure including an inner chamber and two outer chambers adjacent opposing sides of the inner chamber according to yet another example embodiment.

In some embodiments, an enclosure may include an inner chamber and two outer chambers adjacent different sides of the inner chamber. For example, FIG. 5 illustrates an equipment enclosure 500 substantially similar to the enclosure 400 of FIG. 4, but including another outer chamber 502 positioned on an opposing side of the inner chamber 102 as the outer chamber 112. In particular, the outer chamber 502 of FIG. 5 is defined by a top exterior wall 508, a bottom exterior wall 510, a side exterior wall 506, and a wall 504 extending between the inner chamber 102 and the outer chamber 502.

Similar to the wall 222 between the chambers 102, 112, the wall 504 includes perforations to allow hydrogen gas released by the rechargeable batteries 114 to pass from the inner chamber 102 into the outer chamber 502. Likewise, the exterior wall 506 includes perforations to allow the hydrogen gas in the outer chamber 502 to exit the enclosure 500 as explained above. As such, additional hydrogen gas may be exhausted from the enclosure 500 when two outer chambers 112, 502 are employed.

The enclosure 500 may also include one or more secondary features as explained above. For example, the enclosure 500 may include additional solid and/or perforated plates, filters, etc. adjacent to and/or within the outer chamber 502.

Figure 6:
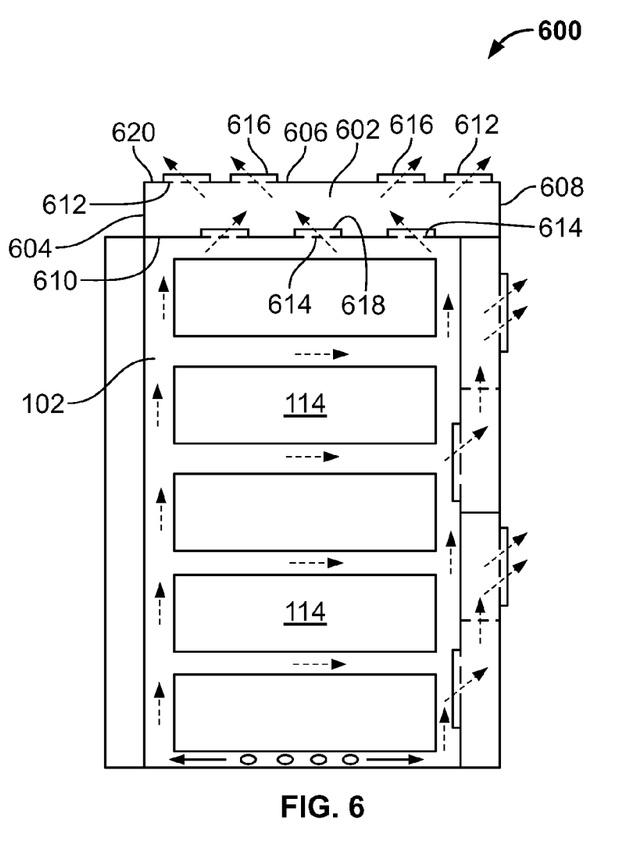
FIG. 6 is a block diagram of an equipment enclosure including an inner chamber and two outer chambers, one adjacent a side of the inner chamber and another adjacent a top of the inner chamber according to another example embodiment.

In other embodiments, an enclosure may include an outer chamber extending across a top portion of the enclosure. For example, FIG. 6 illustrates an equipment enclosure 600 substantially similar to the enclosure 400 of FIG. 4, but including a top outer chamber 602 adjacent the top portion of the inner chamber 102. As shown in FIG. 6, the top outer chamber 602 is defined at least by side exterior walls 604, 608, a top exterior wall 606, and a top wall 610 (e.g., an interior wall) extending between the inner chamber 102 and the top outer chamber 602.

As shown in FIG. 6, the top interior wall 610 includes the perforations 614 to allow hydrogen gas released by the rechargeable batteries 114 to pass from the inner chamber 102 into the top outer chamber 602. Likewise, the top exterior wall 606 includes perforations 612 to allow the hydrogen gas in the top outer chamber 602 to exit the enclosure 600 as explained above. Because the hydrogen gas rises to a top portion of the enclosure 600 as explained above, additional hydrogen gas may be exhausted from the enclosure 600 through the top outer chamber 602 (e.g., via the perforations 612, 614) to thereby lower a concentration of hydrogen gas in the enclosure.

Additionally, the enclosure 600 may include one or more filters similar to the filters 302, 304, 306, 308 of FIG. 3. For example, and as shown in FIG. 6, the enclosure 600 includes filters 616, 618 adjacent the perforations 612, 614 of the walls 606, 610, respectively.

In the example embodiment of FIG. 6, the top interior wall 610 includes three perforations 614 covered by three filters 618 and the top exterior wall 606 includes four perforations 612 covered by four filters 616. Alternatively, the top interior wall 610 and/or the top exterior wall 606 may include more or less perforations and/or filters if desired.

In some example embodiments, the enclosure 600 may include a solar shield adjacent to any one or more of its walls. For example, the top outer chamber 602 may include a solar shield 620 adjacent to the top exterior wall 606 (as shown in FIG. 6), and/or adjacent one or both of the walls 604, 608.

The solar shield 620 may any suitable shield that reflects at least some solar energy. For example, the solar shield may be a component of one or more enclosure walls. In such cases, the enclosure wall(s) may be formed of a particular material to reflect solar energy. In other examples, the solar shield may include a material (e.g., a film, paint, etc.) coupled to the enclosure wall(s). For example, the wall and/or the solar shield may be formed of aluminum (e.g., anodized aluminum, etc.), a fiberglass material, and/or another suitable material that has a desired reflection coefficient (e.g., a ratio of the radiation flux reflected by a surface to the incident radiation flux).

Figure 7:
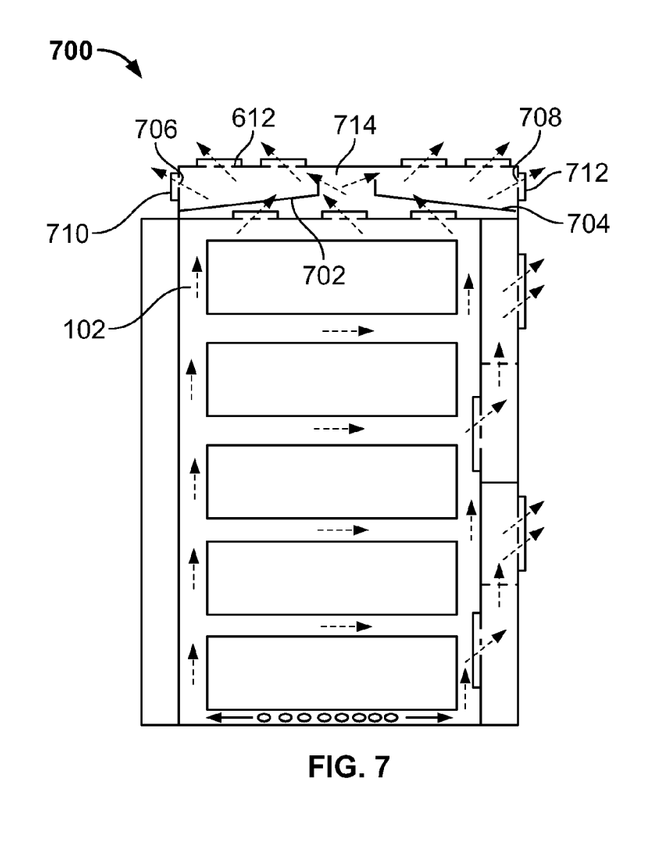
FIG. 7 is a block diagram of an equipment enclosure including an inner chamber and an outer chamber adjacent a top of the inner chamber and having baffles according to yet another example embodiment.

FIG. 7 illustrates another example equipment enclosure 700 substantially similar to the equipment enclosure 600 of FIG. 6, but including a water management system. For example, and as shown in FIG. 7, the enclosure 700 includes a top outer chamber 714 having two baffles 702, 704 for restricting water from entering the inner chamber 102.

In particular, the baffles 702, 704 each include a slanted portion extending from one side of the top outer chamber 714 and a substantially vertical portion extending from an end of the slanted portion. As such, water that may enter via the perforations 612 and/or perforations 706, 708 (further explained below) may be trapped between the baffles 702, 704 and the side walls of the top outer chamber 714 and thus restricted from entering the inner chamber 102. In such cases, the top outer chamber 714 may include a drainage system to remove the water and/or other contaminants.

Additionally, and as shown in FIG. 7, opposing side walls of the top outer chamber 714 include the perforations 706, 708 and filters 710, 712, respectively. The perforations 706, 708 and filters 710, 712 may be substantially similar to the perforations 612 and filters 616 explained above.

Figure 8:
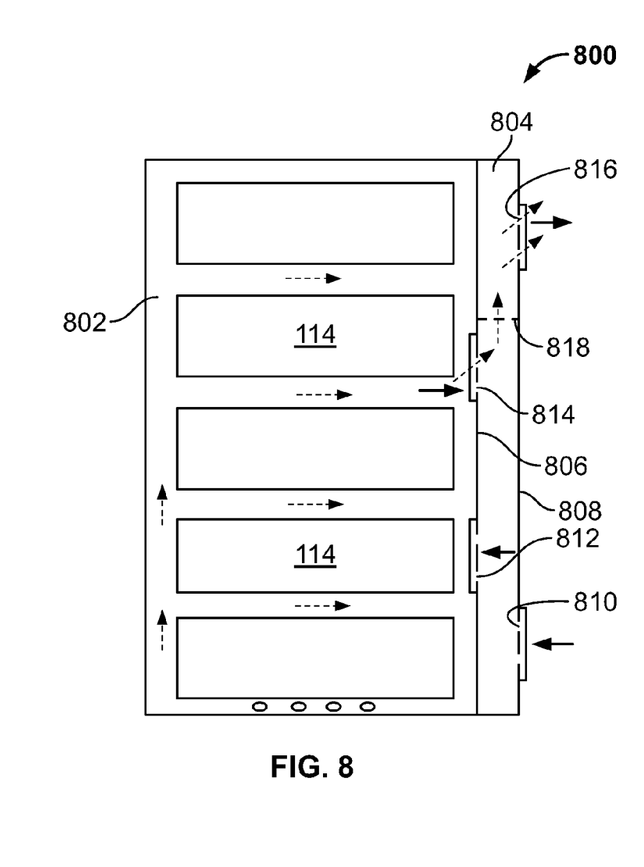
FIG. 8 is a block diagram of an equipment enclosure including an inner chamber and an outer chamber including a wall having perforations according to another example embodiment.

In some embodiments, the outer chamber(s) of an enclosure may multiple sets of one or more perforations. For example, FIG. 8 illustrates an equipment enclosure 800 including an inner chamber 802 having a top, a bottom opposing the top, and multiple sides (of which only two are shown), and an outer chamber 804 adjacent one side of the inner chamber 802. The inner chamber 802 and/or the outer chamber 804 are defined (at least partially) by various walls including, for example, a wall 806 extending between the inner chamber 802 and the outer chamber 804 and/or an exterior wall 808.

The wall 806 includes two sets of perforations 812, 814 and the exterior wall 808 includes two sets of perforations 810, 816. As shown in FIG. 8, the perforations 812 are positioned above the perforations 810 and the perforations 814 are positioned below the perforations 816. The perforations 810, 812 allow ambient air to enter the chambers 804, 802, respectively. For example, ambient air enters the outer chamber 804 via the perforations 810 and then passes into the inner chamber 802 via perforations 812. This air, along with hydrogen gas released from rechargeable batteries 114, exhausts from the enclosure 800 via perforations 814, 816 of the walls 806, 808, respectively, in a similar manner as explained above. As such, the introduction of ambient air into the outer chamber 804 and then into the inner chamber 802 may promote a flow of air to remove hydrogen gas from the enclosure 800 as explained above.

As shown in FIG. 8, the enclosure 800 includes a perforated plate 818 extending between the external wall 808 of the outer chamber 804 and the wall 806 between the inner chamber 802 and the outer chamber 804. The perforated plate 820 may be substantially similar to the perforated plates 402, 404 of FIG. 4.

Figure 9:
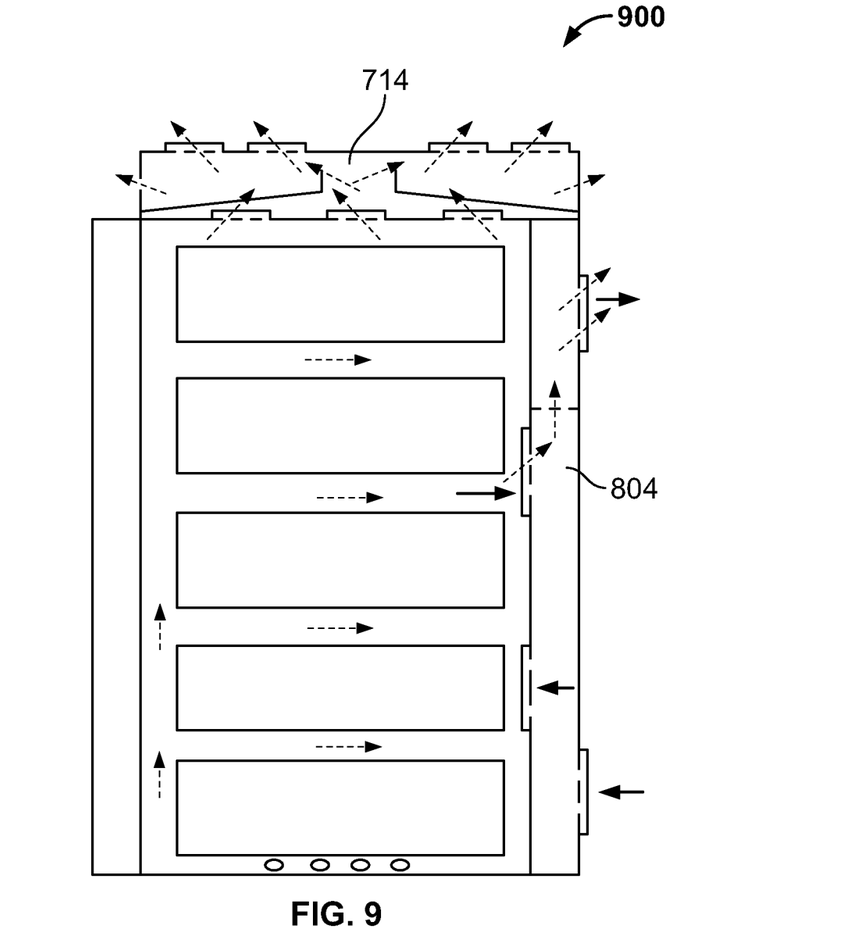
FIG. 9 is a block diagram of an equipment enclosure including an inner chamber and two outer chambers, one of which is adjacent a top of the inner chamber according to yet another example embodiment.

The enclosure 800 may include any one or more secondary features as explained above. For instance, the enclosure 800 may include one or more additional plates (e.g., solid and/or perforated plates, etc.), filters (as shown in FIG. 8), additional perforations, additional outer chambers (e.g., a top outer chamber, etc.), etc. For example, FIG. 9 illustrates another example equipment enclosure 900 including an inner chamber (as explained above), the outer chamber 804 of FIG. 8 and the top outer chamber 714 of FIG. 7.

As explained above, hydrogen gas released from rechargeable batteries in an equipment enclosure may be exhausted by passing (e.g., venting, exhausting, etc.) hydrogen gas from an inner chamber of the equipment enclosure to an outer chamber of the equipment enclosure via perforations in a wall between the chambers. The hydrogen gas may be exhausted from the enclosure by passing the hydrogen gas from the outer chamber via additional perforations in an exterior wall of the outer chamber which are positioned above the perforations in the wall between the chambers.

The enclosures disclosed herein may provide low cost solutions for exhausting hydrogen outgassed from rechargeable batteries within the enclosures while complying with applicable standards (e.g., Telcordia requirements, etc.). Additionally, and as explained above, the enclosures may efficiently exhaust hydrogen gas without impacting thermal performance of the enclosures. For example, testing has shown one or more enclosures disclosed herein can exhaust a suitable amount of hydrogen gas (e.g., 100 mL/min, 123 mL/min, etc.) while exhibiting minimal temperature differences between the disclosed enclosures and conventional enclosures. Further, the outer chambers disclosed herein may provide thermal management benefits by insulating the inner chamber, reducing the amount of solar ingress into the inner chamber, etc.

The enclosures may be deployed outdoors and/or indoors provided appropriate external ventilation. The enclosures may be used as telecommunications enclosures, battery enclosures, power enclosures, etc. In some embodiments, at least a portion of the enclosures may include environmentally sealed portions depending on filters, gaskets, seals, potting, etc.

The enclosures and/or chambers disclosed herein may be any suitable material, size, shape, etc. For example, the enclosure may be about 36"×37"×72", and made of aluminum. The walls of the chambers may be formed of one continuous piece of material or formed of multiple pieces of material. For example, the walls (including portions of) may be defined by equipment housed in the chamber(s) and one or more pieces of sheet metal, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A telecommunications equipment enclosure comprising:
one or more rechargeable batteries capable of releasing hydrogen gas over time; and
a plurality of walls defining a first chamber configured to house the one or more rechargeable batteries and a second chamber adjacent the first chamber, the plurality of walls including a first wall defining a top of the first chamber and a top of the second chamber, a second wall opposing the first wall and defining a bottom of the first chamber and a bottom of the second chamber, a substantially vertical interior wall extending between the first wall and the second wall to separate the first chamber and the second chamber, the substantially vertical interior wall defining one or more perforations to allow hydrogen gas released by the one or more rechargeable batteries to pass in a substantially horizontal direction from the first chamber into the second chamber, and an exterior wall defining one or more perforations to allow the hydrogen gas in the second chamber to exit the telecommunications equipment enclosure.

2. The equipment enclosure of claim 1 further comprising at least one plate extending horizontally between the exterior wall and the substantially vertical interior wall.

3. The equipment enclosure of claim 2 wherein the at least one plate includes a perforated plate.

4. The equipment enclosure of claim 2 wherein the at least one plate includes a solid plate.

5. The equipment enclosure of claim 1 wherein the substantially vertical interior wall is a first vertical interior wall and the exterior wall is a first exterior wall, wherein the plurality of walls further define a third chamber adjacent the first chamber, and wherein the plurality of walls include a second substantially vertical interior wall extending between the first chamber and the third chamber and defining one or more perforations to allow hydrogen gas released by the one or more rechargeable batteries to pass from the first chamber into the third chamber, and a second exterior wall defining one or more perforations to allow the hydrogen gas in the third chamber to exit the enclosure.

6. The equipment enclosure of claim 1 wherein the plurality of walls further define a top outer chamber adjacent the top of the first chamber, wherein the first wall extends between the first chamber and the top outer chamber and defines one or more perforations to allow hydrogen gas released by the one or more rechargeable batteries to pass from the first chamber into the top outer chamber, and wherein the plurality of walls includes another exterior wall defining one or more perforations to allow the hydrogen gas in the top outer chamber to exit the enclosure.

7. The equipment enclosure of claim 6 wherein the top outer chamber includes a solar shield.

8. The equipment enclosure of claim 6 wherein the top outer chamber includes one or more baffles for restricting water from entering the first chamber.

9. The equipment enclosure of claim 6 wherein said other exterior wall includes a side wall.

10. The equipment enclosure of claim 1 further comprising one or more filters adjacent the perforations of the exterior wall and configured to allow hydrogen gas to pass and restrict water from entering the second chamber.

11. The equipment enclosure of claim 1 further comprising one or more filters adjacent the perforations of the substantially vertical interior wall extending between the first wall and the second wall to separate the first chamber and the second chamber, the filters configured to allow hydrogen gas to pass and restrict water from entering the first chamber.

12. The equipment enclosure of claim 1 wherein the one or more perforations of the exterior wall is a first set of one or more perforations and wherein the exterior wall includes a second set of one or more perforations to allow ambient air to enter the second chamber.

13. The equipment enclosure of claim 12 wherein the one or more perforations of the substantially vertical interior wall is a first set of one or more perforations and wherein the substantially vertical interior wall includes a second set of one or more perforations to allow ambient air to enter the first chamber to promote a flow of air to remove hydrogen gas from the enclosure.

14. The equipment enclosure of claim 13 further comprising at least one plate extending horizontally between the exterior wall and the substantially vertical interior wall.

15. The equipment enclosure of claim 7 wherein the top outer chamber includes one or more baffles for restricting water from entering the first chamber.

16. The equipment enclosure of claim 7 wherein said other exterior wall includes a side wall.

17. The equipment enclosure of claim 8 wherein said other exterior wall includes a side wall.

18. The equipment enclosure of claim 1 wherein the one or more perforations of the substantially vertical interior wall are positioned below the one or more perforations of the exterior wall.

19. A telecommunications equipment enclosure comprising:
one or more rechargeable batteries capable of releasing hydrogen gas over time; and
a first chamber configured to house the one or more rechargeable batteries, a second chamber adjacent a side of the first chamber, a third chamber adjacent another side the first chamber opposing the second chamber, and a top chamber adjacent a top of the first chamber, the first chamber and the second chamber separated by a wall having one or more perforations to allow hydrogen gas released by the one or more rechargeable batteries to pass in a substantially horizontal direction from the first chamber into the second chamber, the first chamber and the third chamber separated by a wall having one or more perforations to allow hydrogen gas released by the one or more rechargeable batteries to pass in a substantially horizontal direction from the first chamber into the third chamber, the first chamber and the top chamber separated by a wall having one or more perforations to allow hydrogen gas released by the one or more rechargeable batteries to pass from the first chamber into the third chamber, the second chamber, the third chamber, and the top chamber each including an exterior wall defining one or more perforations to allow the hydrogen gas in the second chamber, the third chamber, and the top chamber to exit the telecommunications equipment enclosure.

20. The equipment enclosure of claim 19 wherein the one or more perforations of the wall separating the first chamber and the second chamber are positioned below the one or more perforations of said exterior wall of the second chamber.

* * * * *